Figure 1:
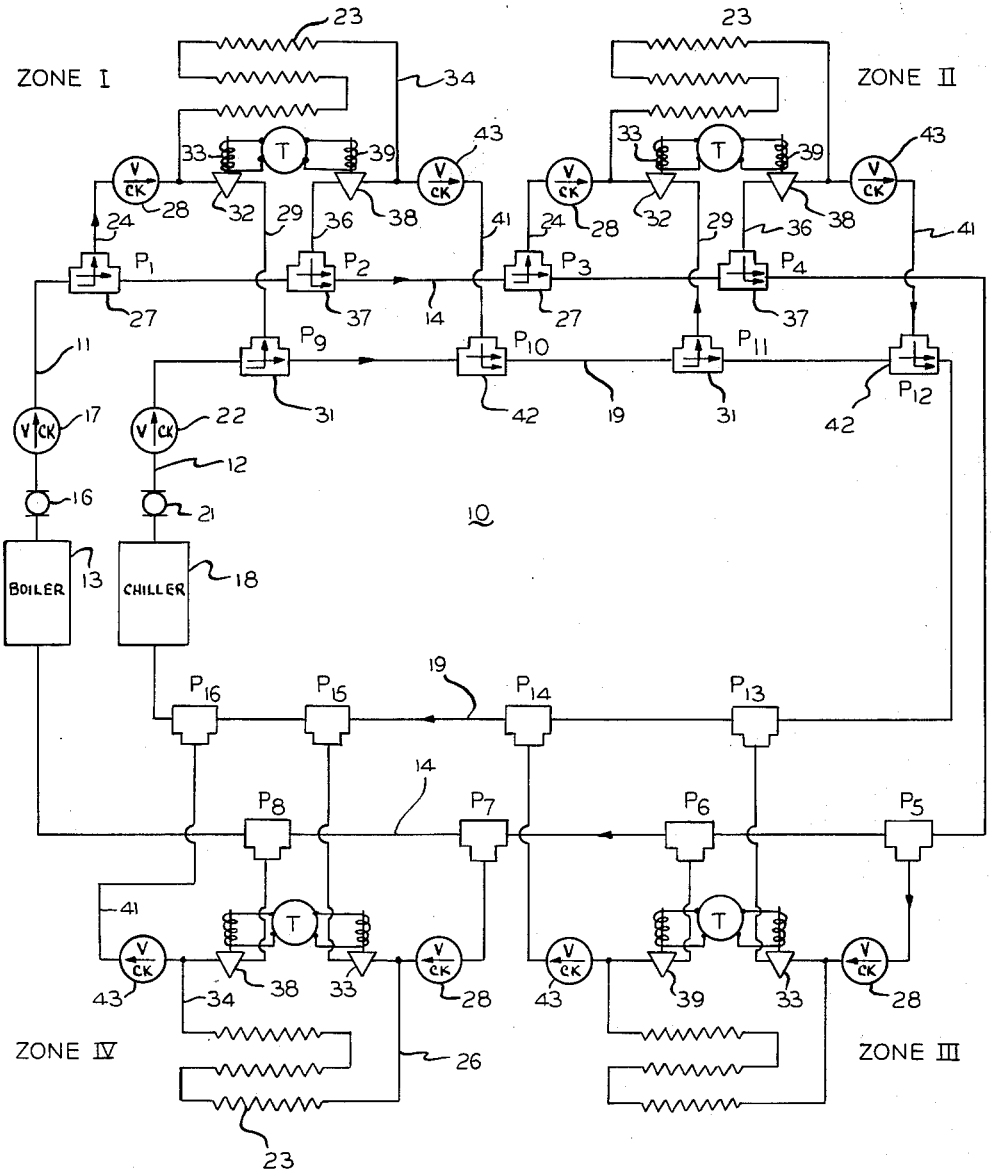

INVENTOR.
GILBERT F. CARLSON
ATTORNEY

United States Patent Office 3,256,929
Patented June 21, 1966

---

3,256,929
PIPING SYSTEM PROVIDING INSTANTANEOUS CHANGEOVER FROM HEATING TO COOLING AND VICE VERSA
Gilbert F. Carlson, Skokie, Ill., assignor to International Telephone and Telegraph Corporation, a corporation of Maryland
Filed May 8, 1964, Ser. No. 366,061
3 Claims. (Cl. 165—26)

This application is a continuation-in-part of application Ser. No. 232,069, filed October 22, 1962, now abandoned.

This invention relates to systems for the heating and cooling of large spaces such as commercial installations, office building, and large buildings or the like, and relates particularly to a system employing two-pipe circuitry for the instantaneous change from heating and cooling and vice versa.

One of the problems attendant upon the maintenance of proper temperature conditions within large structures is that of changing over from a heating cycle to a cooling cycle. At certain times of the year, generally at the beginning and end of the heating season, it is desirable that the heating and cooling systems be capable of responding to demand for either heating or cooling. For example, the areas on that side of the building exposed to the sun may demand cooling, while areas on the shady side may be demanding heat. Heretofore accommodation of the demand for either heating or cooling has been achieved by two separate heating and cooling systems, each such system having a supply pipe and a return pipe, making in all a four-pipe system.

In those systems where separate pipes have been provided for the supply of heating liquid and cooling liquid, use has been made of a common return line. But this has given rise to extraordinary demands upon the apparatus supplying chilled liquid to the cooling system and the boiler supplying hot water to the heating system, since the chilling apparatus must cool down return water from the hot water system and the boiler must heat return water from the cooling system.

In those systems where two pipes have been employed, one for cooling liquid and the other for heating, the flow through the radiation has been reversed on change from the cooling to the heating cycle. Since it is desirable to connect the radiation with the inlet at the bottom and the outlet at the top of purge any air pocketing, such prior art systems have been open to the objection that one or the other cycle tends to air pocket.

With the foregoing considerations in mind, it is a principal object of this invention to provide a separate hot water heating system and a separate cooling system, each being employed with common radiation or heat exchangers always having the liquid coursing therethrough in the same direction, and capable of being readily switched from a heating cycle to a cooling cycle, all without intermix of water from one of the systems with the water of the other system.

Another object is to provide discrete single pipe hot water and chilled water systems, each system being capable of being connected to a heat exchange device adapted to have the flow therethrough in the same direction of either hot or cold water, but the water of the two systems being prevented from crossing from one system to the other.

Other objects and important features of the invention will be apparent from a study of the following specification taken with the drawings, which together describe and illustrate some preferred embodiments of the invention, and what are now considered to be the best modes of practicing the principles thereof. Other embodiments may be suggested to those having the benefit of the teachings herein, and such other embodiments are intended to be reserved especially as they fall within the scope and spirit of the subjoined claims.

Figure 2:
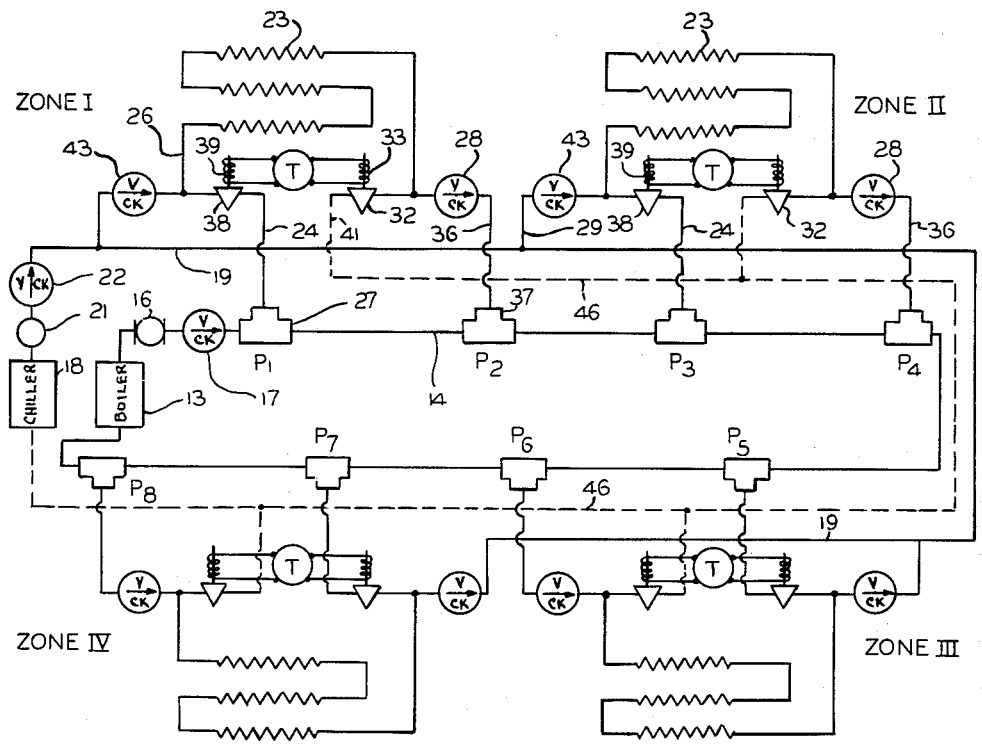

In the drawings:

FIG. 1 shows a hot and cold water piping system adapted for use in the heating or cooling of a space, and embodying the improvements according to the present invention; and FIG. 2 shows an alternate form of system where the cold liquid supply system has a separate return line.

Referring now to the drawings, the improvements according to the embodiment of the invention seen in FIG. 1 are denoted by the reference numeral 10, and include a hot liquid circuit 11 and a cold liquid circuit 12. The hot liquid circuit 11 may include a boiler 13, or other convenient source of heat, to which is connected a closed pipe or loop 14, circulation being maintained in the closed loop 14 by means of a circulating pump 16. Flow in the reverse direction through the pipe 14 is prevented by a check valve 17, which permits flow therethrough only in the direction shown by the arrow.

Cold liquid circuit 12 may include a chiller 18 connected in a closed cold liquid supply loop 19, circulation being maintained in the loop 19 by means of a circulating pump 21. Flow in the reverse direction in the cold liquid loop 19 is prevented by a check valve 22, which permits flow therethrough only in the direction indicated by the arrow.

The two closed circulating systems, hot liquid circuit 11 and cold liquid circuit 12 are adapted to supply either type of liquid to zones in a confined space, which zones are shown in FIG. 1 as zones I to IV inclusive. According to conditions which may vary throughout the closed spaces designated by zones I to IV, demand for cooling or heating may vary from zone to zone as has been pointed out. Each of the zones has one or more suitable heat exchange devices thereat for the circulation therethrough of either hot liquid or cold liquid as thermostats T at each zone may require. According to the invention, and irrespective of which type of liquid is supplied to such heat exchanger, there is no intermixing of liquid returned from such heat exchanger with the liquid of the other chircuit. Furthermore, there is no reversal in direction of the liquid through such heat exchanger, as will be shown, upon change from one cycle to the other.

Zone I, for example, includes a heat exchanger or radiation 23 including structure for selectively connecting the same for flow therethrough of either hot or cold liquid. Such structure includes a first supply connection 24 between the lower end 26 of the heat exchanger 23 and the hot liquid circuit 11. Such supply connection 24 may include a device 27 adapted to induce flow, and which has come to be known in the plumbing and heating trades as a "Monoflo" fitting made by International Telephone & Telegraph Corporation of Morton Grove, Illinois. Such fitting 27 may be of a type as disclosed in Kehm Patent No. 2,020,064, issued November 5, 1935 for "Heating System." The flow inducing device 27 is for purposes of illustration only, but any flow producing device may be associated with the heat exchange device 23 for flow therethrough, such as a pump, not shown.

Supply connection 24 to the heat exchange device 23 also includes a flow responsive valve 28 permitting flow therethrough in the direction shown by the arrow. The same lower end 26 of the heat exchange device 23 is provided with a second supply connection to the cold liquid circuit 12, and includes a supply line 29 connected to the cold liquid circuit by a fitting 31, which may be of the same type as fitting 27, or which may be a standard T-fitting in the case where a separate flow inducing device such as a pump is employed for the heat exchange device 23.

The second supply connection 29 to the end 26 of the heat exchange device 23 also includes a valve 32, which may be operated by a solenoid 33 connected into the circuit seen with the actuating means or thermostat T within the zone I. Valve 32 opens upon a demand for cooling at zone I in a manner known in the art.

Structure is provided for a return connection from the heat exchange device 23 to the hot liquid circuit 11 or the cold liquid circuit 12. Such return connection is at the upper end of the heat exchanger 23, so that flow therethrough is always in the same direction, and from the bottom to the top thereof, for the reason previously mentioned. The heat exchange device 23 has its opposite and upper end 34 connected to a first return connection 36, which in turn is connected to the hot liquid circuit 11 by a return fitting 37 of the same general type as referred to at 27, and as referred to in the aforesaid patent. The first return connection 36 from the end 34 of the heat exchange device 23 includes a valve 38 provided with a solenoid 39 which in turn is controlled by the condition responsive actuating means or thermostat T within the zone I. Valve 38 opens upon the demand for heat within the zone I.

Heat exchange device 23 also includes a second return connection 41 from the upper end 34 of the heat exchange device 23, second return connection 41 being connected to the cold liquid circuit 12 by a fitting 42, as before described. Second return connection 41 has a reverse flow blocking valve 43 therein permitting flow only in the direction of the arrow shown thereon.

It may be noted that each of the corresponding structures at the zones II, III and IV are labeled identically with the structures seen at zone I. It may be noted also that the particular and peculiar control valve and check valve relationships which have been described with reference to FIG. 1 to prevent inter-circuit liquid mixing appears at first glance to be illogical. However, and as will now be shown, the circuitry is intirely logical and will not permit inter-mixing from one closed liquid circuit to the other.

Consider now a condition with pump 16 of the hot liquid circuit 11 in operation, and pump 21 of the cold liquid circuit 12 not in operation. This assumption is not a necessary one to operation, but is made only for simplicity in describing the operation obtaining where there is no intermix between circuits. Such being the case, there must be a pressure differential between point $P_1$ on the hot liquid circuit 11 and point $P_{10}$ on the cold liquid circuit 12, there being no pump pressure in circuit 12. With this given pressure differential, it would seem logical that flow would obtain from $P_1$ through check valve 28 of zone I, heat exchange device 23 and then through check valve 43 to $P_{10}$. While flow would appear to be established to cause intermixing between the hot and cold liquid circuits, it must be remembered that flow can obtain only if there is a return connection from the cold liquid circuit 12 to the hot liquid circuit 11.

To state the proposition broadly: Liquid drawn from a closed liquid circulating loop must be returned to it. If the liquid cannot return, it cannot leave.

Since the pressure at $P_1$ does not substantially diminish through the structure of valve 28, heat exchanger 23 and valve 43, it can be conceded that the pressure energy obtaining at point $P_{10}$ will be the equivalent (approximately) of the pressure energy had at the point $P_1$. Such being the case, it is apparent that the liquid will attempt to flow from $P_{10}$ to be diverted at point $P_{11}$ and thence to flow to $P_3$ on the hot liquid circuit 11 since $P_3$ is at a lower pressure energy condition and is "downstream" from point $P_1$. Assuming that flow is possible from point $P_{11}$ at zone II past thermostatically controlled valve 32, flow responsive valve 28 will block such flow. Furthermore, flow through the heat exchange device 23 at zone II past control valve 38 at zone II, will prevent flow from point $P_{10}$ to $P_{11}$ through control valves 83 and back to point $P_4$ because control valve 38 is closed, if control valve 32 at zone II is open.

Likewise, and now considering zone III, cold liquid cannot flow from point $P_{13}$ on cold liquid circuit 12 to point $P_5$ on hot liquid circuit 11 because control valve 33 thereat is closed if zone III is demanding heat. The same is true also of the heat transfer at zone III, since the control valve 33 operating thereat is demanding heat as at zone II (previously discussed) and the same check and other valve operations would apply.

The same reasoning applies to the other liquid branching points $P_5$ to $P_8$ on hot liquid circuit 11 and to points $P_{14}$ to $P_{16}$ on cold liquid circuit 12. Detailed analysis for the flow obtaining at heat exchange device 23 at the separate zones is believed not necessary by reason of the foregoing analysis.

To recapitulate, however, consider the flow of heating liquid through the heat exchanger 23 at zone I by reason of operation of the pump 16. A high pressure will obtain at point $P_1$ and a relatively lower one at point $P_2$, the latter point being "downstream" from point $P_1$. If zone I is demanding heat, valve 38 will open, and flow of liquid will be induced through the heat exchange device 23 past check valve 28 and past open valve 38, flow being maintained from point $P_1$ to $P_2$. As explained previously, cold liquid circuit 12 cannot receive liquid even though check valve 43 would ordinarily permit flow therethrough, since there cannot be any differential in pressure between point $P_1$ on the hot liquid circuit 11 and the cold liquid circuit 12.

Consider now a situation obtaining where the pump 21 in cold liquid circuit 12 is in operation to circulate cold liquid therethrough, and hot liquid pump 16 is circulating hot liquid through the hot liquid circuit 11. Assume also that zone I is calling for heat and that zone II is calling for cold liquid. Under this condition thermostatic control valve 32 at zone I is closed, while valve 38 at zone I is open. Conversely, valve 32 at zone II is open, while valve 38 at zone II is closed.

As before, heat will be supplied to the heat exchanger 23 at zone I in a circuit commencing at point $P_1$ and ending at point $P_2$ through check valve 28, heat exchanger 23 past open thermostatically controlled valve 38 and to the lower pressure point $P_2$ on the hot liquid circuit 11. At this time, valve 32 is closed, and flow cannot go from the hot liquid circuit 11 to the cold liquid circuit 12 at point $P_9$. Also, and as described previously, although reverse flow blocking valve 43 would appear to permit the flow of hot liquid in the direction shown, the pressure at $P_{10}$ in cold liquid circuit 12 is equal to or greater than the pressure of hot liquid at the return end 34 of heat exchange device 23. Consequently, the flow of hot liquid through heat exchange device 23 can be completed only to the point $P_2$ and not to point $P_{10}$ on cold liquid circuit 12.

At zone II, which is now calling for cooling, flow will be maintained through the heat exchanger 23 thereat from point $P_{11}$ to point $P_{12}$ on cold liquid circuit 12, valve 32 being opened upon demand for cold, and the flow being completed past check valve 43 at zone II to point $P_{12}$ "downstream" from $P_{11}$ on cold liquid circuit 12. Valve 38 being closed because there is no demand for heat, there can be no flow from cold liquid circuit 12 to the hot liquid circuit 11 at point $P_4$. Since check valve 28 at zone II will not permit flow therethrough in a direction opposite to the arrow shown thereat, there cannot be any flow from the cold liquid circuit 12 by-passing the heat exchange device 23 at zone II.

It will be seen from the description obtaining with respect to FIG. 1, that there has been provided separate hot liquid and cold liquid circuits comprising in total only two pipes, and characterized by the fact that radiation or heat exchange devices connected into such circuits can be used interchangeably and instantaneously for either a cold cycle or a hot cycle without the possibility of intermixing liquid from one circuit to the other.

It will also be noted that irrespective of whether a particular zone is calling for heat or cold, the flow of liquid through the radiation is always in the same direction, from the bottom to the top thereof, always to purge the radiation of any possibility of air blockage.

Referring now to FIG. 2 of the drawings, there is shown another embodiment of the invention where the cold liquid circuit includes a return line, making it a two-pipe circuit rather than a one-pipe circuit as was described with reference to FIG. 1.

In this embodiment of the invention, structures common to the embodiment of FIG. 1 are labeled with the same reference numerals, but it may be noted that at the separate zones, the control valve 38 which opens on a demand for heat, is placed in supply line 24 instead of return line 29 as was the case with FIG. 1. Control valve 32, which opens on demand for cooling, is placed in return line 41 to the cold liquid circuit instead of the supply line 29 as was the case with FIG. 1. Likewise, valves 28 and 43 are reversed in their respective positions, valve 43 becoming the flow responsive valve permitting the flow of cold liquid to supply side 26 of heat exchanger 23, and valve 28 becoming the reverse flow blocking valve permitting the completion of flow through the heat exchanger 23 to the hot liquid circuit 11, which in this case is a one-pipe circuit, as has been described with respect to FIG. 1.

In this embodiment of the invention, cold liquid circuit 12 includes a return line 46 connected back to the input side of the chiller 18. By reason of the provision of return cold liquid line 46, and under a condition where zone I is demanding cooling, the circuit through the heat exchanger 23 at zone I, for example, will include the valve 43, line 26 to the supply side of heat exchanger 23, line 34, now open control valve 32, and return line 46.

As with the embodiment described particularly with respect to FIG. 1, intermix of the liquid passing through the heat exchanger 23 at zone 1 or any of the other zones is prevented by the inability of the other liquid system, be it hot or cold, to accommodate additional liquid.

It may be noted that in any of the embodiments of the invention, valves 28 and 43 are always of the same sense, i.e., flow therethrough is always in a "downstream" direction, a seemingly anomalous manner or condition, and one permitting of intermix of the hot and cold liquid circuits. As has been shown, such cannot occur, and it is believed that this matter of connecting these valves constitutes an important feature of the invention.

From the description foregoing it is believed evident that there has been provided some new and useful improvements in hot and cold liquid heating and cooling systems, where such system includes separate and discrete circuits, and where the zones connected in the two circuits are capable of being instantaneously heated or cooled all without the possibility of intermixing of liquid from one circuit with the liquid of another circuit. In all of the embodiments illustrated the flow through the radiation is in the same direction, and from the bottom to the top, always in a direction to purge trapped air therefrom.

While the invention has been described in terms of a number of preferred embodiments thereof, the scope thereof is not intended to be limited by the precise embodiments herein shown, nor otherwise than by the scope of the appended claims.

I claim:

1. In a system having a pair of liquid circuits, each of which circuits includes means for changing the temperature of the liquid therein, at least one heat exchange device adapted to be connected selectively in said circuits, means for connecting said heat exchange device selectively to said circuits for flow therethrough, said means comprising a pair of supply connections to said heat exchange device connected in parallel with each other and comprising a first supply connection to one of said liquid circuits and having a flow responsive valve connected therein adapted to pass liquid from said one circuit to said heat exchange device, a second supply connection to the other of said liquid circuits and having a condition responsive valve connected therein, means for actuating said condition responsive valve in accordance with a demand condition at said heat exchange device, a pair of return connections from said heat exchange device connected in parallel with each other, the first of said return connections being connected in series with said first named supply connection and said heat exchange device and the said one of said liquid circuits and having a condition responsive valve connected therein, said actuating means also actuating said last named condition responsive valve, the second of said return connections being connected in series with said second named supply connection and said heat exchange device and the said other of said liquid circuits and having a reverse flow blocking valve therein.

2. The invention of claim 1 wherein both of said flow responsive and said reverse flow blocking valves are connected in the same flow sense in their respective supply and return connections.

3. The invention of claim 1 wherein said actuating means for said condition responsive valves is so constructed and arranged as to operate said condition responsive valves alternately.

References Cited by the Examiner

UNITED STATES PATENTS

| 2,492,757 | 12/1949 | Meek | 165—50 X |
| 2,588,723 | 3/1952 | Herman | 165—50 X |
| 3,069,867 | 12/1962 | Ringquist. | |
| 3,127,928 | 4/1964 | Ringquist | 165—22 |
| 3,127,929 | 4/1964 | Ringquist | 165—22 |

JAMES W. WESTHAVER, *Primary Examiner.*